United States Patent
Lee et al.

(10) Patent No.: US 9,596,412 B2
(45) Date of Patent: Mar. 14, 2017

(54) METHOD AND APPARATUS FOR PHOTOGRAPHING AN IMAGE IN A USER DEVICE

(71) Applicant: Samsung Electronics Co., Ltd., Gyeonggi-do (KR)

(72) Inventors: Sungwook Lee, Seoul (KR); Jangwon Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 190 days.

(21) Appl. No.: 13/684,999

(22) Filed: Nov. 26, 2012

(65) Prior Publication Data

US 2013/0135510 A1 May 30, 2013

(30) Foreign Application Priority Data

Nov. 25, 2011 (KR) ........................ 10-2011-0124006

(51) Int. Cl.
*H04N 5/232* (2006.01)
*H04N 5/235* (2006.01)

(52) U.S. Cl.
CPC ....... *H04N 5/23293* (2013.01); *H04N 5/2356* (2013.01); *H04N 5/23212* (2013.01); *H04N 5/23216* (2013.01)

(58) Field of Classification Search
CPC ........... H04N 5/23212; H04N 5/23293; H04N 5/23216; H04N 5/235; H04N 5/2365; H04N 5/23229; H04N 5/2353; H04N 5/238; H04N 1/00411; H04N 1/0044; G03B 13/36; G03B 13/16; G03B 7/00; G06F 3/04847; G06F 3/04883; G06F 3/0484; G06F 2203/04806; G06F 2203/04808
See application file for complete search history.

(56) References Cited

U.S. PATENT DOCUMENTS

| | | | |
|---|---|---|---|
| 6,919,927 B1 * | 7/2005 | Hyodo | 348/333.02 |
| 7,034,881 B1 * | 4/2006 | Hyodo et al. | 348/333.12 |
| 7,649,562 B2 * | 1/2010 | Misawa | G06F 3/03547 345/173 |
| 8,466,996 B2 * | 6/2013 | Sakai | G06F 3/04847 345/173 |
| 8,681,237 B2 * | 3/2014 | Battles et al. | 348/222.1 |
| 8,767,113 B2 * | 7/2014 | Sakai | G06F 3/04847 345/173 |
| 9,025,070 B2 * | 5/2015 | Saito | H04N 5/23212 348/345 |
| 9,113,086 B2 * | 8/2015 | Kim | H04N 5/2351 |
| 2003/0011700 A1 * | 1/2003 | Bean et al. | 348/345 |

(Continued)

FOREIGN PATENT DOCUMENTS

| | | |
|---|---|---|
| JP | 2009-095049 | 4/2009 |
| KR | 100805293 | 2/2008 |

(Continued)

*Primary Examiner* — Michael Osinski
(74) *Attorney, Agent, or Firm* — The Farrell Law Firm, P.C.

(57) ABSTRACT

A method of photographing an image is provided. The method includes displaying a preview image in a photographing mode; receiving a plurality of setting values for an option; receiving a request for photographing; and performing a continuous photographing by sequentially changing the plurality of the setting values in response to the request for photographing.

10 Claims, 5 Drawing Sheets

(56) References Cited

U.S. PATENT DOCUMENTS

| | | | |
|---|---|---|---|
| 2003/0025821 A1* | 2/2003 | Bean et al. | 348/345 |
| 2007/0040810 A1* | 2/2007 | Dowe | G06F 3/0414 |
| | | | 345/173 |
| 2008/0117300 A1* | 5/2008 | Shin et al. | 348/191 |
| 2009/0015703 A1 | 1/2009 | Kim et al. | |
| 2009/0059057 A1* | 3/2009 | Long et al. | 348/343 |
| 2009/0059061 A1* | 3/2009 | Yu et al. | 348/347 |
| 2009/0244357 A1* | 10/2009 | Huang | 348/345 |
| 2010/0289916 A1* | 11/2010 | Battles et al. | 348/222.1 |
| 2011/0043655 A1* | 2/2011 | Park et al. | 348/222.1 |
| 2011/0267530 A1* | 11/2011 | Chun | 348/333.11 |
| 2011/0267531 A1* | 11/2011 | Imai | 348/333.12 |
| 2012/0057062 A1* | 3/2012 | Hamada et al. | 348/333.02 |
| 2012/0069235 A1* | 3/2012 | Imai | 348/333.11 |
| 2012/0105674 A1* | 5/2012 | Sakaji | H04N 5/23216 |
| | | | 348/229.1 |
| 2012/0120277 A1* | 5/2012 | Tsai | 348/223.1 |
| 2012/0147245 A1* | 6/2012 | Iijima et al. | 348/333.11 |
| 2012/0212661 A1* | 8/2012 | Yamaguchi et al. | 348/346 |
| 2012/0249819 A1* | 10/2012 | Imai | 348/222.1 |
| 2013/0050565 A1* | 2/2013 | Wernersson et al. | 348/345 |
| 2013/0070145 A1* | 3/2013 | Matsuyama | 348/333.12 |
| 2013/0141604 A1* | 6/2013 | Yang | 348/222.1 |
| 2013/0278809 A1* | 10/2013 | Itoh et al. | 348/333.01 |
| 2014/0009572 A1* | 1/2014 | Matsumoto et al. | 348/36 |
| 2015/0199098 A1* | 7/2015 | Park | G06F 3/0484 |
| | | | 715/790 |

FOREIGN PATENT DOCUMENTS

| | | |
|---|---|---|
| KR | 1020090006454 | 1/2009 |
| KR | 1020110073974 | 6/2011 |

* cited by examiner

METHOD AND APPARATUS FOR PHOTOGRAPHING AN IMAGE IN A USER DEVICE

PRIORITY

This application claims priority under 35 U.S.C. §119(a) to a Korean patent application filed on Nov. 25, 2011 in the Korean Intellectual Property Office and assigned Serial No. 10-2011-0124006, the entire disclosure of which is incorporated herein by reference.

BACKGROUND OF THE INVENTION

1. Field of the Invention

The present invention relates generally to a method and apparatus for photographing an image in a user device, and more particularly, to a method and an apparatus for photographing an image in a user device that supports photographing of an image based on automatic focusing in which an image of a subject is photographed based on a focus that is automatically calculated from a distance to the subject, where the user device includes an image photographing apparatus that supports a touch-based input.

2. Description of the Related Art

Due to the recent development of digital technology, various types of mobile devices capable of performing communication and processing personal information have been made, including a mobile communication terminal, a Personal Digital Assistant (PDA), an electronic organizer, a smartphone, or a tablet Personal Computer (PC). Through rapid technological development, mobile devices now include various functions ranging from an initial basic function such as a voice call and a short message transmission to a video call, an electrical organizer function, a video photographing function, an email function, an Internet function, and a Social Networking Service (SNS) function.

Specifically, camera modules have recently become common, allowing a user device equipped with a camera module to have a video photographing function. The user device displays a preview image of a subject transmitted by the camera module through a display unit and photographs an image shown on the preview image based on a user's photographing command to be stored. The user device then compresses an image signal captured by the camera module to be stored in a storage unit of the user device. The user device supporting a digital image photographing function is widely used due to its advantages in that photographing and editing an image is easy even for a user who is not an expert, compared to a camera using film, and a long-term storage and preservation of the image data is possible.

Moreover, an automatic focusing function, by which a distance from the subject is automatically calculated to perform automatic focusing to obtain a clear image of the subject when a photographing button is pressed, and a zoom function, by which a subject a far distance from the user device is photographed as if the subject is a short distance or a subject a short distance from the user device is photographed as if the subject is in a far distance from the user device, are additionally included in a photographing function of the user device, thereby improving user convenience.

In the user device, to photograph a subject, the user performs the photographing function by using the photographing button in the photographing mode. When performing the photographing function in the photographing mode, an additional photographing function of an automatic focusing function or a zoom function, as described above, is supported. In a conventional user device, when photographing an image using an additional photographing function, one time selection of the automatic focusing function or the zoom function based on a user's choice and one time photographing is performed. For example, when the automatic focusing function is operated in the photographing mode, the user focuses a specific part of the subject by a half shutter input of the photographing button and photographs the subject based on the focus.

Further, when the zoom function is operated in the photographing mode, the user sets a zoom-in or a zoom-out automatically or manually and photographs with a correspondingly set zoom.

Further, when a conventional, continuous photographing function is performed by the user, a continuous photographing is performed with one focus or one zoom level that is set one time, as described above.

Therefore, when the user wants to perform continuous photographing by changing the focus multiple times, a first focal point of the subject is first selected and the composition of the subject is changed based on a corresponding focal point to perform photographing, and a second focal point is selected and the composition of the subject is changed based on a corresponding point to perform photographing again. Moreover, when operating the zoom function, the zoom function must be set each time photographing is performed. Accordingly, in the continuous photographing mode of the user device, continuous photographing is supported only with respect to one focus or one zoom level, and the continuous photographing with respect to various focuses or various zoom points is possible only by repeated photographing and the user's repeated focus and zoom function setting.

Thus, in performing the continuous photographing based on various focuses or various zoom points with respect to one subject, a photographing time is longer and a task is repeated, thereby causing inconvenience to the user. Moreover, during the function setting described above in a photographing process, user may become dissatisfied when an initially intended user composition is changed or the subject is moved.

SUMMARY OF THE INVENTION

Accordingly, the present invention has been made in view of the above problems, and provides an apparatus and a method for improving user convenience in photographing an image by operating an additional function in a user device that supports a photographing function.

The present invention further provides a method and an apparatus for photographing an image in a user device that improves quality and user convenience by means of continuous photographing by temporally dividing a process of setting an option and a corresponding photographing process.

The present invention further provides a method and an apparatus for photographing an image in a user device that photographs a resulting object using different option values through continuous photographing based on a plurality of option values (e.g., multi-focus, multi-exposure, multi-zoom points, and the like) set by a user's touch input prior to photographing.

The present invention further provides a method and an apparatus for photographing an image in a user device that improves user convenience, utility of the user device, by implementing an optimal environment for operating a photographing function of the user device.

In accordance with an aspect of the present invention, a method of photographing an image is provided. The method includes displaying a preview image in a photographing mode; receiving a plurality of setting values for an option; receiving a request for photographing; and performing a continuous photographing by sequentially changing the plurality of the setting values in response to the request for photographing.

In accordance with another aspect of the present invention, a method of photographing an image is provided. The method includes displaying a preview image in a photographing mode; activating a multi-focus mode; sequentially receiving a plurality of touch inputs on the preview image; setting a plurality of focuses corresponding to an input order of the plurality of the touch inputs; receiving a request for continuous photographing; and sequentially changing the plurality of the focuses in response to the request to perform the continuous photographing.

In accordance with another aspect of the present invention, there is provided a computer-readable recording medium on which a program for executing the method in a processor is recorded.

In accordance with another aspect of the present invention, a user device is provided. The user device includes a display unit for displaying a preview image in a photographing mode and receiving a plurality of touch inputs on the preview image; a camera module for supporting a continuous photographing based on a plurality of option setting values set in the photographing mode; and a controller for recording a plurality of setting values with respect to one option based on the touch input in the photographing mode and, when photographing, controlling the continuous photographing by sequentially changing the plurality of the setting values.

BRIEF DESCRIPTION OF THE DRAWINGS

The above and other aspects, features, and advantages of the present invention will be more apparent from the following detailed description in conjunction with the accompanying drawings, in which.

Figure 1:
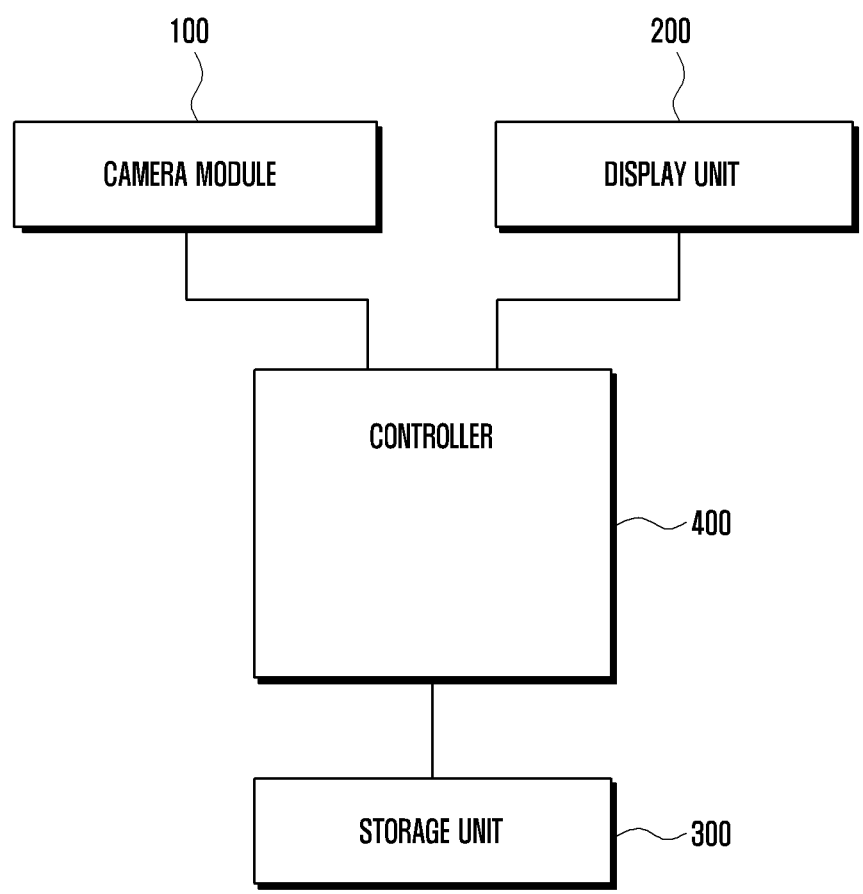
FIG. 1 illustrates a schematic configuration of a user device according to an embodiment of the present invention.

DETAILED DESCRIPTION OF EMBODIMENTS
OF THE PRESENT INVENTION

Various embodiments of the present invention are described below with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

The present invention relates to a method and an apparatus for photographing an image in a user device. Specifically, according to the present invention, photographing of an image of a subject is supported based on a focus that is automatically calculated from a distance to the subject in an image photographing apparatus that supports a touch-based input, wherein the focus is selected as a multi-focus and a continuous photographing if multi-focus is supported. According to an embodiment of the present invention, in a photographing mode, with respect to an option (e.g., a focus, exposure, zoom, white balance, brightness, film speed (ISO), etc.) for photographing, a plurality of setting values (e.g., multi-focus values, multi-exposure values, multi-zoom values, multi-white balance values, multi-brightness values, multi-ISO values, and the like) are set in advance according to a user's touch input. Also, after setting option values, a plurality of setting values of a corresponding option are automatically changed when photographing the subject, thereby supporting a continuous photographing in which photographing is automatically performed each time the setting values are changed.

For example, a user performs a continuous photographing function according to a multi-focus mode in the photographing mode. Also, the user continuously performs a plurality of touch inputs with respect to locations of focuses for photographing on a preview screen. When the selection of a plurality of focuses is completed, photographing is performed based on a photographing button so that a continuous photographing is performed based on the plurality of the focuses set based on the touch input, thereby producing each image data corresponding to each focus.

Alternatively, in photographing mode, the user performs the continuous photographing function based on a multi-zoom mode in the photographing mode. Moreover, the user continuously performs a plurality of touch inputs with respect to locations of zoom points for photographing on the preview screen. For example, the user successively performs a first touch input, i.e., touch the preview screen, move a touch point in an upward direction, and cancel the touch (e.g., "zoom-out gesture"), perform, after the first touch input, a second touch input, i.e., touch the preview screen, move the touch point in the upward direction, and cancel the touch (e.g., "zoom-out gesture"), and perform, after the second touch input, a third touch input, i.e., touch the preview screen, move the touch point in a downward direction, and cancel the touch (e.g., "zoom-in gesture"). When the selection of zoom points by a plurality of touch inputs (e.g., the first through third touch inputs) is completed, photographing is performed using the photographing button.

A first photographing is performed while zooming out in a first step according to a zoom-out value predefined according to the first interaction, a second photographing is performed while, from a zoomed-out condition of the first step, zooming out in a second step according to a zoom-out value predefined according to the second interaction, and a third photographing is performed while, from a zoomed-out condition of the second step, zooming in, in a third step according to a zoom-in value predefined according to the third interaction. In other words, the continuous photographing is performed based on a plurality of zoom points set according to the touch input, thereby producing each image data corresponding to each zoom condition.

Alternatively, in photographing mode, the user performs the continuous photographing function according to a multi-brightness mode in the photographing mode. Also, the user continuously performs a plurality of touch inputs with respect to brightness for photographing on the preview screen. In the case of the multi-brightness mode, respective setting values are mapped to a number of touch inputs performed by the user in advance. For example, a first brightness value is mapped to a first touch input, a second brightness value is mapped to a second touch input, and a third brightness value is mapped to a third touch input. Therefore, the user respectively performs the first touch input in which the user taps the preview screen, performs the second touch input in which the user taps the preview screen after the first touch input, and performs the third touch input in which the user taps the preview screen after the second touch input. Moreover, when the selection of brightness values by an input of a plurality of touch inputs (e.g., the first through the third touch inputs) is completed, the photographing is performed based on the photographing button.

A first photographing is performed at a first brightness value according to the first touch input, a second photographing is performed at a second brightness value according to the second touch input, and a third photographing is performed at a third brightness value according to the third touch input. In other words, the continuous photographing is performed based on a plurality of brightness values set according to the touch input, thereby producing each image data corresponding to each brightness value.

Similar to the operation of the above example, a plurality of setting values of other options such as, for example, a multi-white balance mode, a multi-ISO mode, or a multi-resolution mode are sequentially and automatically changed, thereby supporting the continuous photographing in which photographing is automatically performed each time the setting values are changed.

Hereinafter, a configuration of a user device and a method of controlling an operation thereof according to embodiments of the present invention will be described with reference to accompanying drawings. However, it should be noted that the configuration of the user device and the method of controlling the operation thereof according to embodiments of the present invention are not restricted or limited to particular embodiments described below but extend to various modifications.

FIG. 1 illustrates a schematic configuration of a user device according to an embodiment of the present invention.

Referring to FIG. 1, a user device according to the present invention includes a camera module 100, a display unit 200, a storage unit 300, and a controller 400. Additionally, the user device includes an audio processing unit including a microphone and a speaker, a digital broadcast module for receiving a digital mobile broadcast such as, for example, a Digital Multimedia Broadcasting (DMB) or a Digital Video Broadcasting (DVB), at least one short range communication module for supporting a communication function based on a short range radio communication such as Bluetooth®, Infrared Data Association (IrDA), Radio Frequency IDentification (RFID) or Near Field Communication (NFC), an input unit for supporting a hard key based input, a Radio Frequency (RF) module for supporting a communication function such as a voice call, a video call, or a data communication (e.g., SMS, MMS, e-mail, internet browsing, etc.) based on a mobile communication, a communication module for supporting an internet communication service based on Internet Protocol (IP), and a battery for supplying power to the above elements. A description and illustration of the above elements are omitted.

The camera module 100 supports photographing of a static image and a dynamic image of a subject. The camera module 100, controlled by the controller 400, photographs a certain subject and transmits a captured image data to the display unit 200 and the controller 400. The camera module 100 is configured to include a camera sensor (not shown) for converting an input optical signal into an electrical signal and a signal processing unit (not shown) for converting the electrical signal input from the camera sensor into a digital image data. The camera sensor includes a Charge-Coupled Device (CCD) sensor or a Complementary Metal-Oxide-Semiconductor (CMOS) sensor. Specifically, in the present invention, the camera module 100 supports an automatic, continuous photographing, in response to one photographing input, according to multi-setting values for one option (e.g. a focus, exposure, zoom, white balance, brightness, ISO, etc.) selected in advance by a user.

The display unit 200 displays a screen related to an operating condition of the user device and an action performed by the user device. For example, the display unit 200 displays a home screen of the user device or an execution screen according to the execution of various applications. Also, in the present invention, a Liquid Crystal Display (LCD) is typically used for the display unit 200; however, other display devices such as a Light-Emitting Diode (LED), an Organic Light-Emitting Diode (OLED), or an Active Matrix OLED (AMOLED) can be used. Additionally, in the present invention, the display unit 200 includes an interface that supports a touch-based input. For example, the display unit 200 supports various touch-based user inputs by configuring a touchscreen and generate an input signal according to the user input to be transmitted to the controller 400. Also, when displaying the execution screen described above, the display unit 200 ay supports to display a screen in landscape mode or in portrait mode, depending on the direction in which the user device is rotated (or in which the user device is laid), and switches between the portrait and landscape modes.

Particularly, in the present invention, the display unit 200 supports the touch-based input and, in a photographing mode, the display unit 200 receives a plurality of touch inputs according to an operation of a multi-option function and transmits a resulting input signal to the controller 400. For example, when displaying a preview image, the display 200 receives a touch input for selecting a plurality of focuses for multi-focus or selecting a plurality of zoom points and transmits a resulting input signal to the controller 400. Further, in photographing mode, the display unit 200 displays the preview image and a photographing screen of an image data photographed based on multi-setting values (e.g., multi-focus, multi-zoom points, and the like) according to one option. Example screens displayed by the display unit 200 will be described later.

The storage unit 300 stores various applications and data executed and processed in the user device and includes at least one non-volatile memory and volatile memory. In the present invention, the non-volatile memory corresponds to, for example, a Read-Only Memory (ROM) or a flash memory, and the volatile memory corresponds to, for example, a random Access Memory (RAM). The storage unit 300 continuously or temporarily stores the user device's operating system, a program and a data that are related to a display control operation of the display unit 200, a program and a data that are related to an input control operation using the display unit 200, a program and a data that are related to operating a function of the user device, and a program and a data that are related to operating a continuous photographing function (e.g., a continuous photographing function based on the multi-focus, a continuous photographing function based on a multi-zoom, and the like) with respect to one option. Moreover, in the present invention, the storage unit 300 stores an image data photographed in the photographing mode. Particularly, the storage unit 300 stores multi-setting values and an input order thereof with respect to one option, which are set according to the touch input, such as, for example, when operating a multi-focus function in the photographing mode, location information of a plurality of focuses and sequence information thereof according to a user's selection, and when operating the multi-zoom function, location information of a plurality of zoom points and sequence information thereof based on the user's selection.

The controller 400 controls an overall operation of the user device. Particularly, in the present invention, the controller 400 controls an operation of the continuous photographing function based on an option selected according to a sequential touch input of the user in the photographing mode. For example, in the photographing mode of the present invention, the continuous photographing is controlled based on a plurality of setting values for one option which is set according to a plurality of touch input inputs. In the present invention, the option includes an option related to operating a photographing feature such as, for example, focus, exposure, zoom, white balance, brightness, resolution, or ISO, as described above, and in the present invention, a plurality of setting values are selected to be set for each option by the user's touch input before photographing.

For example, in the photographing mode, when an option for the multi-focus mode is activated, the touch input is sequentially and continuously input while the multi-focus mode is activated, and the photographing function is requested, the controller 400 controls the continuous photographing to perform photographing by sequentially and automatically changing a focus of each location according to an input order of each touch input. The continuous photographing is continuously performed according to each focus of each location according to a number of touch inputs. Also, the controller 400 generates and stores an image data corresponding to each focus based on the number of touch inputs as a result of a multi-focus continuous photographing.

Additionally, in the photographing mode, when an option for the multi-zoom mode is activated, the touch input is sequentially and continuously input while the multi-zoom mode is activated, and the photographing function is requested, the controller 400 controls the continuous photographing to perform photographing by sequentially and automatically changing a zoom condition (e.g., sequential zoom-in, sequential zoom-out, or a combination of zoom-in and zoom-out, and the like) at each location according to an input order of each touch input. The continuous photographing is continuously performed according to each zoom condition of each location according to the number of the touch inputs. Also, the controller 400 generates and stores an image data corresponding to each zoom condition according to the number of the touch input as a result of a multi-zoom continuous photographing.

Moreover, the controller 400 controls an operation of various modes such as, for example, a multi-exposure mode, a multi-white balance, a multi-brightness mode, a multi-resolution mode, or a multi-ISO mode, in the same manner as the multi-focus mode or multi-zoom mode. The multi-focus mode is described hereinafter as a representative example; however, the present invention is not limited thereto. Therefore, it should be understood that the present invention, as described above, supports the continuous photographing based on multi-setting values for one option set by a plurality of touch inputs of the user in various modes corresponding to user settings.

A detailed control operation of the controller 400 described above will be explained in connection with an example operation of the user device and a control method thereof, which will be described below with reference to the accompanying drawings. Also, the controller 400 controls various operations related to a typical function of the user device, in addition to the function described above. For example, the controller 400 controls an operation of a specific application and a display thereof. Further, the controller 400 receives an input signal corresponding to various touch event inputs supported by a touch-based input interface and control an operation of a corresponding function. Additionally, the controller 400 controls transmission and reception of various data based on a wired communication or wireless communication.

The user device of the present invention shown in FIG. 1 applies to all types of devices such as, for example, a bar type, a folder type, a slide type, a swing type or a flip type device. Also, the user device according to the present invention includes any information and communication devices, multimedia devices, and application devices thereof that support the image photographing function of the present invention. For example, the user device includes mobile communication terminals that operate according to respective communication protocols corresponding to various communications systems as well as devices such as, for example, a tablet Personal Computer (PC), a smartphone, a digital camera, a Portable Multimedia Player (PMP), a media player, a portable game terminal, a laptop computer, and a Personal Digital Assistant (PDA).

Figure 2:
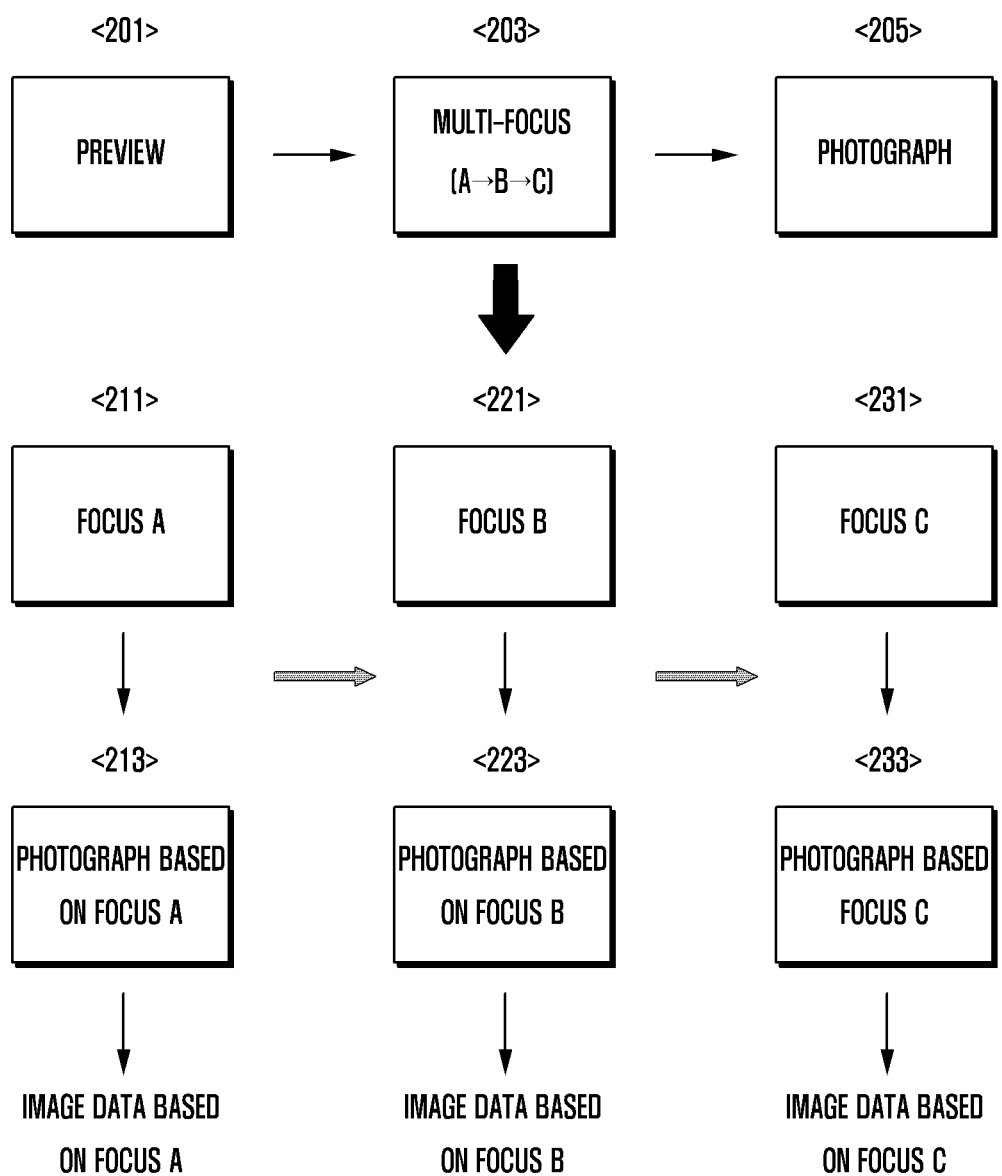
FIG. 2 illustrates an operation of photographing an image supported by a user device according to an embodiment of the present invention.

FIG. 2 illustrates an operation of photographing an image supported by a user device according to an embodiment of the present invention.

Referring to FIG. 2, as shown in step 201, it is assumed that the preview image is displayed on the display unit 200 according to execution of the photographing mode. In other words, when the user executes the photographing mode, an image of the subject captured by the camera module 100 is provided as a preview through the display unit 200.

Next, when the preview image is displayed as shown in step 201, the user sequentially inputs a plurality of touch inputs for selecting a plurality of focuses desired by the user in the preview image at a location corresponding to each focus, as shown in step 203. For example, when the preview image is shown, the user activates the multi-focus mode and sequentially performs a touch-based input that respectively selects a plurality of focus points A, B and C for automatic focusing in the preview image. The controller 400 records and manages a location of the touch input performed in the multi-focus mode and an input order thereof. In an example of FIG. 2, the touch input of the user is performed in an order of a location A, a location B, and a location C, and the controller 400 records and manages a location of each point at which the touch input is performed and an order of focal locations to be automatically changed in an order of location A, location B, and location C.

After selecting locations for multi-focusing as shown in the step 203, the user executes the photographing function as shown in step 205. For example, the user performs a photographing command by using a photographing button (a touch-based soft key or a physical key) that is provided for the photographing function.

Next, when execution of the photographing command is requested after setting the multi-focusing as described above, the controller 400 identifies the order of focal locations for operating the multi-focus function and performs the continuous photographing by focusing at a location according to a corresponding order. The continuous photographing is performed such that photographing is continuously performed three times based on a number of multi focuses.

For example, when detecting the photographing command, the controller 400 focuses the subject of the preview image at the location A that has a first priority, as shown in step 211, performs a first photographing of an image of the subject that is focused at location A, as shown in step 213, and stores an image data thereof. Next, when the first photographing is completed, after the first photographing, the controller 400 focuses the subject of the preview image at location B that has a second priority, as shown in step 221, performs a second photographing of the image of the subject focused at location B, as shown in step 223, and store an image data thereof. When the second photographing is completed, after the second photographing, the controller 400 focuses the subject of the preview image at location C that has a third priority, as shown in step 231, performs a third photographing of the image of the subject focused at location C, as shown in step 233, and stores an image data thereof.

Each image data according to each photographing (e.g., image data photographed based on a focus at location A, image data photographed based on a focus at location B, and image data photographed based on a focus at location C) is stored at each time of photographing based on each focus. Alternatively, each image data is temporarily buffered at each time of photographing and the buffered image data are stored together when every instance of photographing (for example, three instances of photographing according to three focuses set according to three touch inputs) is subsequently completed.

Figure 3:
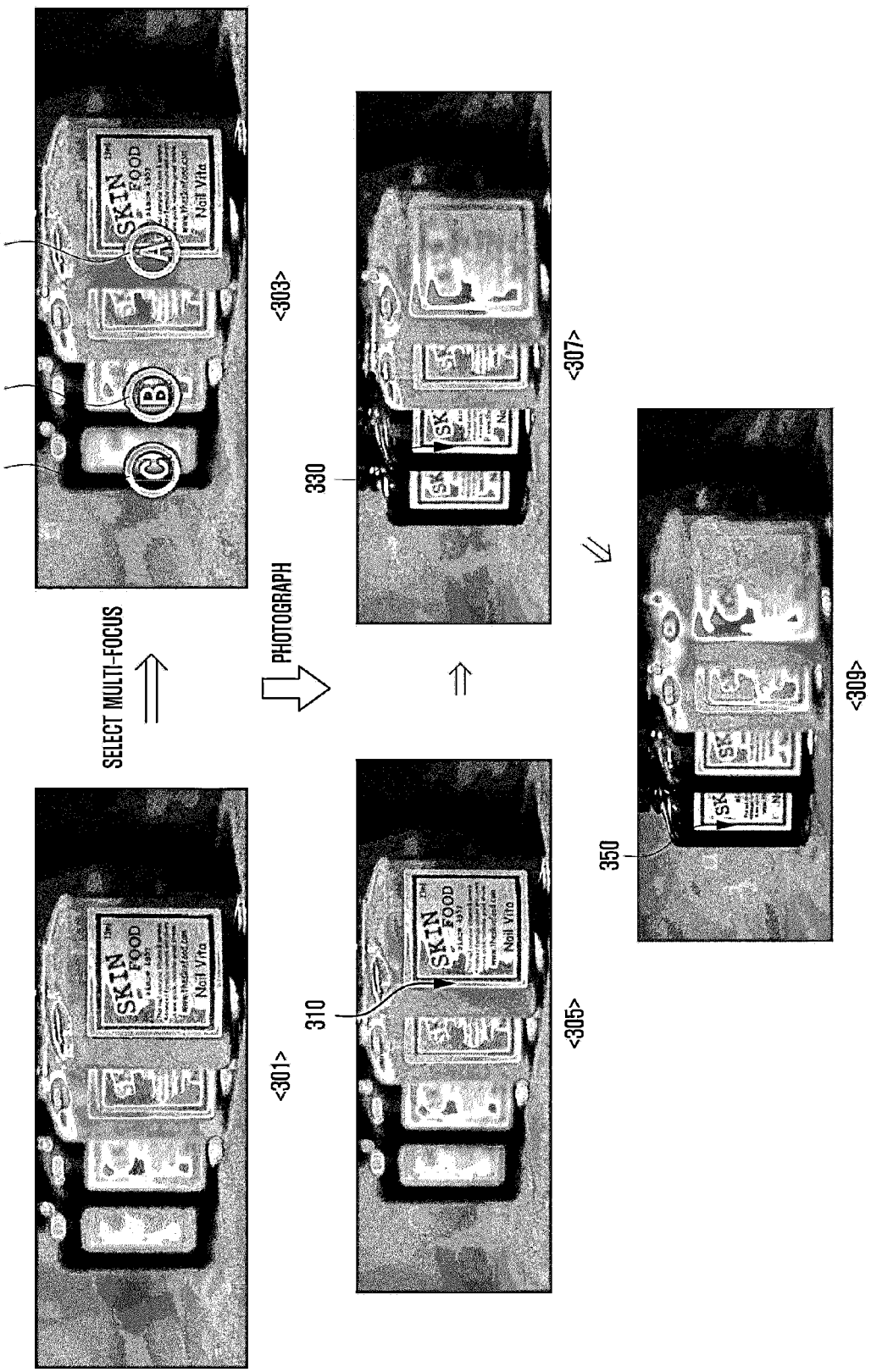
FIG. 3 illustrates a screen in which a subject is photographed based on multi focus in a user device according to an embodiment of the present invention.

FIG. 3 illustrates an example screen in which a subject is photographed based on multi focus in a user device according to an embodiment of the present invention.

Referring to FIG. 3, as shown in step 301, it is assumed that the preview image is displayed on the display unit 200 according to execution of the photographing mode. For example, when the user executes the photographing mode, the image of the subject photographed by the camera module 100 is provided as a preview through the display unit 200.

As shown in the step 301, the user activates the multi-focus mode when the preview image is shown. For example, the user executes the multi-focus mode by using a menu or executes the multi-focus mode by performing a preset gesture on a screen on which the preview images is shown. The controller 400 provides information based on the activation of the multi-focus mode. For example, the controller 400 displays an item, a text, or an image notifying the activation of the multi-focus mode in an area of the display area 200 as guide information in an overlayed form. The guide information is provided considering an intuitive nature of user according to execution of the multi-focus mode.

After activating the multi-focus mode as described above, the user sequentially performs a plurality of touch inputs for setting desired focuses in the preview image, as shown in step 303. For example, the user sequentially performs touch inputs that each select locations of the plurality of focuses (location A, location B, location C) for automatically focusing in the preview image. It is assumed in FIG. 3 that the touch input is performed in an order of location A, location B, and location C.

In the preview image described above, the user performs three consecutive touch inputs in the preview image for focusing at the locations A, B, and C and pressed the photographing button for performing the photographing function.

When the photographing button is pressed after touch inputs for a plurality of locations for the multi-focus are performed as shown in the step 303 (i.e., multiple setting values for a focusing option are set), the controller 400, as shown in step 305 to step 309, sequentially performs photographing of an image focused on the selected locations (e.g., location A, location B, and location C) according to the touch input. For example, the controller 400 identifies an order of a location of each focus for performing the continuous photographing based on the multi-focus mode and performs the continuous photographing by focusing at a location of a corresponding order. Here, the continuous photographing is performed such that the photographing is continuously performed three times according to a number of focuses selected by the touch input as above.

For example, as shown in step 305, the subject of the preview image shown in step 303 is photographed by automatically focusing at the location A 310, which has the first priority. When the photographing focused on the location A 310 is completed, the subject is photographed by automatically focusing the preview image shown in step 303 at location B 330, which has the second priority, as shown in step 307. Next, when the photographing focused on location B 330 is completed, the subject is photographed by automatically focusing the preview image shown in step 303 at location C 350, which has the third priority, as shown in step 309. Accordingly, a resulting image data generated when the continuous photographing is completed includes an image data photographed based on a focus at location A 310, an image data photographed based on a focus at location B 330, and an image data photographed based on a focus at location C 350, which are generated and saved. In other words, a number of image data corresponding to a number of focuses selected by the touch input are generated.

In the above, according to an embodiment of the present invention, the user sets focal points to be used for photographing according to user preference and, when photographing, the user only concentrates on reducing movement of the user device, making the photographing process more convenient and improves the speed, accuracy, diversification, and quality of photographing.

Figure 4:
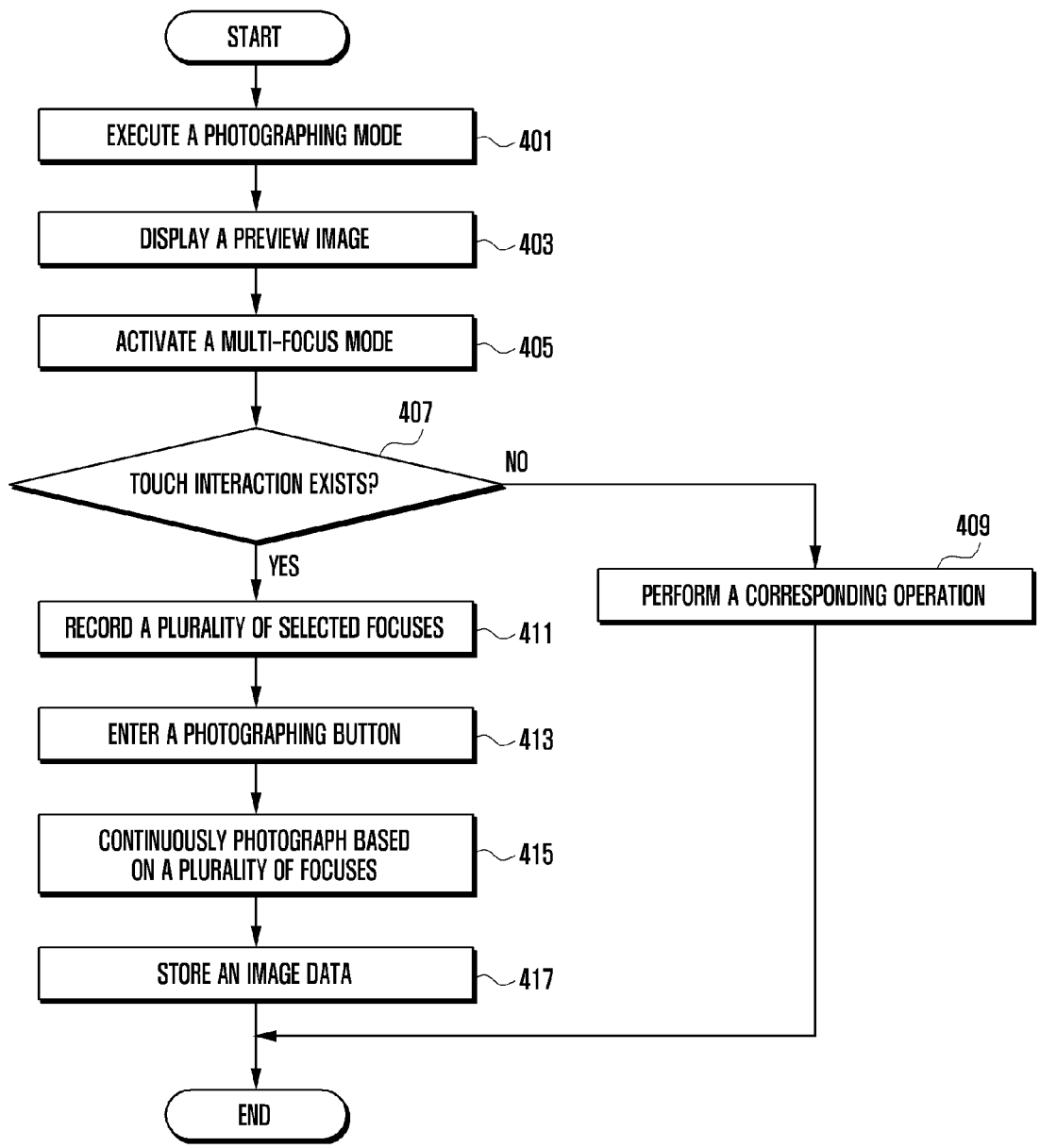
FIG. 4 is a flowchart illustrating a method of photographing an image based on the multi focus operation in a user device according to an embodiment of the present invention.

FIG. 4 is a flowchart illustrating a method of photographing an image based on multi focus in a user device according to an embodiment of the present invention.

Referring to FIG. 4, the controller 400 performs the photographing mode in step 401 and controls a display of a resulting preview image of the subject in step 403. For example, the user activates the image photographing function of the user device. Then, the controller 400 turns on the camera module 100 in response to a user's activation and performs the photographing mode accordingly. Also, the controller 400 provides the image of the subject captured through the camera module 100 to the display unit 200 as the preview image.

Next, the controller 400 activates the multi-focus mode in step 405. Depending on a setting, the multi-focus mode is controlled to be automatically activated when the photographing mode is executed or controlled to be manually activated according to a user's choice after the photographing mode is executed.

Next, after the multi-focus mode is activated, the controller 400 determines whether the touch input is received from the user in step 407. For example, as described above, the controller 400 determines whether at least one touch input is detected in the screen in which the preview image is displayed.

Next, when the touch input is not detected ("No" in step 407), the controller 400 performs a corresponding operation in step 409. For example, the controller 400 waits for a user input with the image of the subject being displayed, or photographs and stores an image of the subject in response to the execution of the photographing function by the user, or displays a list of stored image data and a selected image data or cancels the photographing mode, based on the user's choice.

Next, when the touch input is detected ("YES" in step 407), the controller 400 records a plurality of focal points selected corresponding to the touch input in step 411. For example, when three consecutive touch inputs are detected, the controller 400 records and manages a location at which each touch input is selected and an input order thereof.

Next, after recording the plurality of the focal pints in response to a plurality of the touch input inputs, as described above, the controller 400 detects an input from the photographing button in step 413. For example, the user performs the plurality of the touch inputs and then presses the photographing button for performing the photographing function.

Next, when detecting the input from the photographing button, the controller 400 controls photographing based on the plurality of focal points selected as described above in step 415. For example, when three focal points are recorded according to three touch inputs, the controller 400 checks the input order of the touch inputs input with respect to three focal points and sequentially controls the continuous photographing based on each focal point.

Next, the controller 400 stores a plurality of image data captured according to the photographing in step 417. For example, when the continuous photographing is performed with respect to three focal points according to three touch inputs, the controller 400 stores an image data of each photographing based on three focal points in such a manner that an image data photographed based on a focus of a highest priority is stored and an image data photographed based on a focus of a next highest priority is stored. Alternatively, the controller 400 controls storage of the image data in such a manner that corresponding image data based on respective focal points is temporarily stored and temporary image data is stored together when the continuous photographing is completed.

Figure 5:
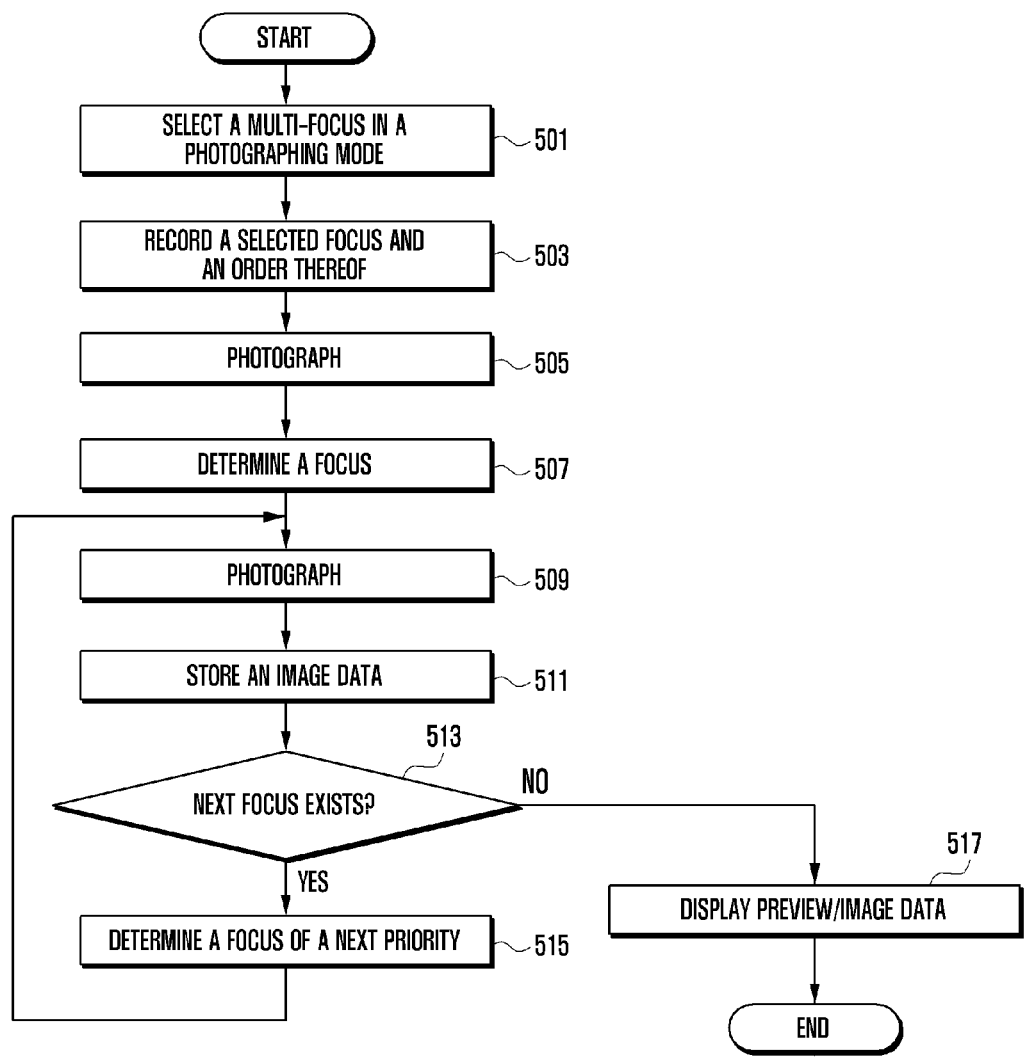
FIG. 5 is a flowchart illustrating a photographing method based on the operation of a multi focus mode in a user device according to an embodiment of the present invention.

FIG. 5 is a flowchart illustrating a photographing method based on operation of a multi focus mode in a user device according to an embodiment of the present invention.

Referring to FIG. 5, the controller 400 receives the plurality of the touch inputs for selecting the multi-focus from the user when the photographing mode is being executed in step 501. As an example, the multi-focus mode is executed automatically or manually in the photographing mode.

Next, when the touch input is detected, the controller 400 records a point selected based on the touch input and an input order thereof in step 503. In other words, when detecting the touch input, the controller 400 sets a focus of the point selected by a corresponding touch input and a photographing order based on the focus. For example, the controller 400 determines a point selected by a first touch input as a location of a first focus and records an order thereof and determines a point selected by a second touch input, which is input after the first touch input, as a location of a second focus and record an order thereof, and in this manner, the above operation is controlled according to the number of input touch inputs.

Next, the controller 400 detects a request for photographing from the photographing button in step 505. For example, the user performs at least one touch input and then presses the photographing button for performing the photographing function.

Next, when detecting the input from the photographing button, the controller 400 determines the focus selected by the touch input in step 507. Also, the controller 400 performs photographing based on the determined focus in step 509 and stores a resulting image data in step 511. For example, the controller 400 extracts a focus selected by a touch input of a first priority among the plurality of the focuses selected by the plurality of the touch inputs and controls a first photographing based on a corresponding focus. Also, the controller 400 stores a first image data photographed according to the first photographing.

Next, the controller 400 determines whether a next focus that is set exists when the first photographing is completed in step 513.

Next, when the next focus that is set exists ("YES" in step 513), the controller 400 determines the focus selected according to the touch input of a next priority in step 515. Also, the controller 400 performs photographing based on the determined focus in step 509 and repeatedly performs the below operation. For example, the controller 400 extracts a focus selected by a touch input of a second priority among the plurality of the focuses selected by the plurality of the touch inputs and controls a second photographing based on a corresponding focus. Also, the controller 400 stores a second image data photographed according to the second photographing. The photographing operation of the controller 400 is performed based on a number of focuses recorded according to a number of a plurality of the touch input inputs. For example, when three focuses are recorded according to three touch inputs, the controller 400 controls such that photographing is performed three times continuously based on each focus.

Next, when a next focus that is set does not exist ("NO" in step 513), the controller 400 controls the display of the preview screen according to setting or display of the photographed image data in step 517.

Although not described and illustrated in the above, an operation of initializing the multi setting values (e.g., multi-focus values, multi-exposure values, multi-zoom point values, multiple white balance values, multi-brightness values, multi-resolution values, multiple ISO values, etc.) of an option set for the continuous photographing in various modes based on a plurality of touch inputs in the photographing mode is further included according to an embodiment of the present invention. For example, when the multi focus mode is activated in the photographing mode, the user sets multiple focuses by the plurality of the touch inputs and, prior to pressing the photographing button, the user initializes the plurality of the focuses set based on the plurality of the touch inputs by activating set cancel menu or an input of a set user gesture. The input of the set user gesture corresponds to a gesture of drawing a certain type of a character or a shape in the preview screen.

The foregoing method for photographing an image of the present invention may be implemented in an executable program command form by various computer means and recorded in a computer readable recording medium. The computer readable recording medium includes a program command, a data file, and a data structure individually or a combination thereof. The program command recorded in a recording medium is specially designed or configured for the present invention or be known to a person having ordinary skill in a computer software field to be used. The computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM. RAM, flash memory storing and executing program commands. Further, the program command includes a machine language code created by a compiler and a high-level language code executable by a computer using an interpreter. The foregoing hardware device may be configured to be operated as at least one software module to perform an operation of the present invention, and vice versa.

As mentioned above, according to a method and an apparatus for photographing an image of the user device suggested by the present invention, a plurality of setting values (e.g., multi-focused values, multi-exposure values, multi-zoom point values, multi-white balance values, multi-brightness values, etc.) for one option for photographing is set in advance in the photographing mode according to the user's touch input. After setting option values, the set option values are sequentially and automatically changed when photographing the subject, thereby supporting the continuous photographing in which photographing is automatically performed each time the option values are changed. According to the present invention, by performing the continuous photographing function based on a plurality of preset setting values for one option, time between photographing according to each setting value is reduced. Also, by reducing the time between photographing, a change to an initially intended composition or movement of the subject between image data is minimized, thereby enabling photographing based on various setting values with respect to one option.

Also, according to the present invention, by classifying a user input and a photographing operation that are repeatedly generated in the photographing mode into a pre-processing operation for setting and a post-processing operation for photographing, such that the user needs to focus on setting an option based on the touch input in the pre-processing operation and focus on reducing the movement of the user device in the post-processing operation to improve photographing, thereby facilitating a process of photographing itself as well as supporting to obtain an image data of a better quality.

Also, according to the present invention, in the photographing mode of the user device, a frequency of changing the option setting value and a frequency of user input for photographing is minimized, thereby supporting a fast continuous photographing based on various setting values for one option. The present invention is implemented in all forms of the user device and various corresponding devices thereof. Further, according to the present invention, an optimal environment for supporting the photographing function in the user device is implemented. Therefore, when operating the photographing function in the user device, the present invention renders the photographing function more efficient and convenient to use, thereby improving user convenience as well as improving utility and competitiveness of the user device.

Although certain embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims and their equivalents.

What is claimed is:

1. A method of photographing an image for a user device, the method comprising:
   capturing a photograph by a camera module;
   changing the photograph to a preview image;
   displaying the preview image on a screen;
   while the preview image is being displayed, sequentially receiving a plurality of touch inputs exclusively on a plurality of objects of the preview image that selects a plurality of setting values for a parameter set by a user;
   performing, when a request for photographing is received after receiving the plurality of touch inputs, a first photographing based on a setting value of a highest priority from among the plurality of the setting values and storing a first image data based on the first photographing;
   performing a second photographing based on a setting value of a next highest priority from among the plurality of the setting values and storing a second image data based on the second photographing, when the first photographing is completed; and
   editing, when a request for activating a menu or an input of a predetermined gesture is received after receiving the plurality of touch inputs, the plurality of the setting values,
   wherein the parameter includes a focus, an exposure, a zoom, a white balance, a brightness, and a film speed (ISO).

2. The method of claim 1, further comprising:
   entering the plurality of the setting values.

3. A method of photographing an image for a user device, the method comprising:
   capturing a photograph by a camera module;
   changing the photograph to a preview image;
   displaying the preview image on a screen in a photographing mode;
   while the preview image is being displayed, sequentially receiving a plurality of touch inputs from a user;
   setting at least one of a plurality of exposures and brightnesses corresponding to a number of the received plurality of touch inputs;
   sequentially attaining, when a request for continuous photographing is received, the set at least one of the plurality of exposures and brightnesses;
   performing a first photographing based on at least one exposure and brightness extracted as a first priority from among the set at least one of the plurality of exposures and brightnesses and storing a first image data photographed based on the first photographing;
   performing a second photographing based on at least one exposure and brightness extracted as a second priority from among the set at least one of the plurality of exposures and brightnesses and storing a second image data photographed based on the second photographing, when the first photographing is completed; and
   editing, when a request for activating a menu or an input of a predetermined gesture is received after setting the at least one of the plurality of ex exposures and brightnesses, the set at least one of the plurality of exposures and brightnesses.

4. The method of claim 3, wherein setting the at least one of the plurality of exposures and brightnesses comprises:
   setting the at least one of the plurality of exposures and brightnesses based on the number of the touch inputs on a plurality of objects of the preview image and setting a photographing order based on the set at least one of the plurality of exposures and brightnesses.

5. The method of claim 3, wherein sequentially attaining the set at least one of the plurality of exposures and brightnesses comprises:
 identifying the input order of the touch input; and
 sequentially changing at least one exposure and brightness according to the identified input order and continuously performing photographing each time each of the set at least one of the plurality of exposures and brightnesses is attained.

6. The method of claim 3, further comprising:
 repeatedly performing the first photographing and performing the second photographing.

7. The method of claim 3, further comprising:
 displaying the preview image or a photographed image data when photographing based on the set at least one of the plurality of exposures and brightnesses is completed.

8. A user device, the device comprising:
 a display unit for displaying a preview image on a screen and for sequentially receiving a plurality of touch inputs on a plurality of objects of the preview image;
 a camera module for supporting a continuous photographing based on a plurality of parameter setting values set by a user; and
 a controller for recording a plurality of setting values with respect to one parameter based on the plurality of touch inputs on the plurality of objects of the preview image, controlling, when a request for performing photographing after the recording a plurality of setting values is received, a first photographing based on a setting value of a highest priority from among the plurality of the setting values and storing a first image data based on the first photographing, and controlling a second photographing based on a setting values and storing a second image data based on the second photographing, when the first photographing is completed, and editing, when a request for activating a menu or receiving an input of a predetermined gesture is received after recording the plurality of setting values, the plurality of the setting values,
 wherein the parameter includes a focus, an exposure, a zoom, a white balance, a brightness, and a film speed (ISO).

9. The user device of claim 8, wherein the controller sets focuses based on points selected by the plurality of the touch inputs on the plurality of objects of the preview image and an order of photographing based on the focuses, and sequentially changes each option setting value based on the order of photographing and continuously controls photographing each time each setting value is changed.

10. The user device of claim 9, wherein the controller repeatedly performs the photographing corresponding to the plurality of the setting values.

* * * * *